United States Patent [19]

Régis et al.

[11] Patent Number: 5,152,640

[45] Date of Patent: Oct. 6, 1992

[54] COMPOSITE CIRCULAR AND ROTARY CUTTING TOOL

[75] Inventors: Rose Régis, Saint Cyr Au Mont D'Or; Christian Souchon, Vougy, both of France

[73] Assignee: Demurger et Cie, France

[21] Appl. No.: 642,004

[22] Filed: Jan. 16, 1991

[30] Foreign Application Priority Data

Jan. 19, 1990 [FR] France .................. 90 00815

[51] Int. Cl.⁵ .............................. B26D 1/12
[52] U.S. Cl. ........................ 407/32; 407/56
[58] Field of Search ............ 407/20, 21, 23, 24, 407/27-29, 31, 32, 53, 55, 56

[56] References Cited

U.S. PATENT DOCUMENTS

| | | | |
|---|---|---|---|
| 1,258,891 | 3/1918 | Gorham | 407/32 |
| 2,297,445 | 9/1942 | Wenzel | 407/32 X |
| 2,325,746 | 8/1943 | Curtis | 407/32 |
| 2,563,559 | 8/1951 | Sneva | 407/32 X |
| 2,806,772 | 9/1957 | Robie | 51/296 |
| 3,812,755 | 5/1974 | Danielsen | 407/32 X |

FOREIGN PATENT DOCUMENTS

| | | |
|---|---|---|
| 1063747 | 10/1979 | Canada . |
| 0221875 | 5/1987 | European Pat. Off. . |
| 1088408 | 9/1960 | Fed. Rep. of Germany . |
| 3039063 | 5/1982 | Fed. Rep. of Germany . |
| 3236045 | 3/1984 | Fed. Rep. of Germany . |
| 8811470 | 11/1988 | Fed. Rep. of Germany . |
| 3806235 | 12/1988 | Fed. Rep. of Germany . |
| 2196214 | 3/1974 | France . |
| 244405 | 9/1946 | Switzerland . |
| 644111 | 10/1950 | United Kingdom ........... 407/32 |
| 694292 | 7/1953 | United Kingdom ........... 407/32 |
| 2102445 | 2/1983 | United Kingdom . |

Primary Examiner—Larry I. Schwartz
Assistant Examiner—J. R. Daulton
Attorney, Agent, or Firm—Wall and Roehrig

[57] ABSTRACT

A circular cutting blade is provided in which the body is a synthetic fiber glass reinforced material which has a metallic hub and an outer cutting ring made from high speed steel, tungsten carbide, ceramic material or other cutting materials for a particular application. The outer cutting ring has an inwardly projecting tenon portion that has periodic trapezoidal recesses. The body of the blade is integrally molded about the tenon filling the recesses with the molded body to form torque projections to ensure that the outer ring is driven integrally with the blade body during cutting operations.

10 Claims, 3 Drawing Sheets

COMPOSITE CIRCULAR AND ROTARY CUTTING TOOL

BACKGROUND OF THE INVENTION

The invention relates to a circular rotary cutting tool used especially for cutting products or articles made of steel and other materials, such as, for example, wood. It relates more specifically to a rotary cutting tool of the type in question, produced by means of two different materials.

Typically, slitting saws to which the invention mainly relates are one-piece. They possess:

at their centre, a driving hub having a bore and equipped with driving holes to allow interaction with a drive shaft, and a peripheral ring comprising the actual cutting zone, the assembly as a whole forming one and the same entity usually produced from so-called "high-speed" steel.

The peripheral ring of slitting saws is toothed. In general terms, these teeth have a spacing and hardness which can vary from one slitting saw to another according to its use and its rotational speed.

In a known way, the body has some clearance, typically of the order of 1 to 2%, intended to allow the discharge of chips of cut material and the lubrication of the cutting zone.

Such one-piece tools have disadvantages by virtue of their very structure and design. First of all, only the operational part of the peripheral ring has to have a suitable hardness. Now, in view of the design, the entire slitting saw is produced with the same alloy, thus entailing not only an extra cost, but a heavy tool, and moreover, necessitating periodic resharpening of the actual cutting zone. Now this resharpening is usually sub-contracted. That implies a large and therefore costly stock requiring relatively strict management. Furthermore, these successive resharpening operations result in a loss of cutting capacity of the tool, in view of the cut made within the peripheral ring itself in order to obtain a form close to that of a new tool.

Besides, in the event of a shock, the tool as a whole is embrittled, often making it unsuitable for subsequent cutting operations.

Finally, because of the solid one-piece nature of this tool, it proves very noisy during cutting, making the operators' work arduous.

There was then provided a cutting tool which is first and foremost light, performs the same functions as the rotary cutting tools known hitherto and makes it possible to damp some of the vibrations inherent in the actual cutting and which, because of its cost price, makes it unnecessary to carry out successive periodic resharpening operations and thereby simplifies the management of the stock of cutting tools. For this purpose, the central body of the cutting tool, of generally circular shape and comprising the hub for driving the tool, is produced from a synthetic material, to which the peripheral ring comprising the actual cutting zone is fastened. Such a tool was described, for example, in the document DE-U-8811470.

Now although the tool produced in this way achieves a technical advance, especially with regard to the reduction of vibrations during cutting, and an undeniable weight saving, nevertheless the method of fastening the peripheral ring to the central body has hitherto proved unsatisfactory. In fact, the fastening can be carried out in various ways. First of all, the peripheral ring can simply be bonded adhesively to the central body. It was soon seen that this method of fastening was inadequate in view of the torque generated in the region of the ring by the central body.

It was then proposed to duplicate this method of fastening with the fitting of rivets or bolts passing through the peripheral ring and the central body in the region of the contact zones. However, this entails at least one additional step of machining the ring and central body and of fitting the said rivets and/or bolts which is incompatible with the industrial production of such tools.

It was then proposed to bond the peripheral ring adhesively to a T-shaped support embeddable in the central body. This technique is unsatisfactory because the torque of the drive shaft is inappropriately transferred to the peripheral ring, this occurring even if orifices capable of being filled with the resin forming the central body are provided in the said support.

Finally, it was proposed to equip the support of the peripheral ring with dovetailed recesses intended to be filled with the resin forming the central body of the tool. Now this method of fastening is completely ruled out because, during the solidification of the resin, there is usually a shrinkage of the plastic which is adversely affected and even prevented by the special dovetail shape of the recesses of the support. Thus, the mechanical stresses associated with the shrinkage of the plastic are exerted preferentially in a preferred direction and not isotropically, thereby inducing a residual warping of the cutting tool which makes it completely unsuitable for use.

SUMMARY OF THE INVENTION

The object of the invention is to provide a composite circular rotary cutting tool, of which the fastening of the peripheral ring to the central body makes it possible to transfer virtually the entire torque of the drive shaft to the peripheral ring comprising the cutting zone, this fastening which can be carried out on an industrial scale not causing any warping of the resulting tool.

This rotary cutting tool comprises:

a body of substantially plane circular shape which is produced from a synthetic material and the centre of which comprises a hub intended to allow the tool to be driven, and a circular peripheral ring comprising the actual cutting zone, produced from a material known for its cutting properties and fastened irreversibly to the body.

It is characterised in that the fastening is carried out:

on the one hand, by means of an inner tenon parallel to and coplanar with the peripheral ring, made on the inner lateral face of the peripheral ring, forming an integral part of the latter and interacting with the body in the region of a complementary groove made on the outer lateral face of the body, and, on the other hand, by means of radial projections obtained from the body and coplanar with it and interacting with the tenon in the region of periodic interruptions of the latter.

In other words, the invention first involves equipping the peripheral ring with a tenon making it possible to prevent the peripheral ring from coming off the rim of the body as a result of its interaction with the complementary groove of the latter, including during sometimes abnormal and very brief uses of such cutting tools.

Secondly, the radial projections of the body which interact with the tenon and consequently with the peripheral ring making it possible to feed to the latter the torque generated by the drive shaft on the body: the peripheral ring is prevented as it were from skidding on the body.

According to one characteristic of the invention, the thickness of the tenon is smaller than the thickness of the actual peripheral ring.

According to another characteristic of the invention, the periodic interruptions of the tenon define recesses, the general shape of which is trapezoidal and widened in the direction of the centre of the tool. Furthermore, the corners so defined are rounded, especially by machining, to make it easier for the synthetic material to shrink during its hardening.

According to another especially advantageous characteristic of the invention, the body of the tool possesses arcuate oblong hollow indentations which are first directed radially from the centre of the body and which then bend in the direction of its periphery until they become virtually parallel to the circumference of the tool. It was thus found that this special structure of the body makes it possible to orient the glass fibres or mineral fibres included in the plastic parallel to the circumference of the tool in the region of the periphery of the body, especially in the region of the interaction of the projections of the body in the trapezoidal recesses, thus assisting the transmission of the torque to the peripheral ring and increasing the mechanical resistance of the body in the region of this peripheral zone which is subjected to particularly high stress when the tool is being used.

Advantageously, in practice:

the component synthetic material of the body is selected from the group consisting of polyester, polyamides, polyarylamides and phenylene polysulphide or mixtures of these products;

the synthetic material of the body is reinforced with glass fibres or filled with mineral material, such as talc and mica, if appropriate completed by balls of these materials; this additive filler is especially effective for obtaining a tool having good resilience in association with a high mechanical resistance necessary during the work of the tool; moreover, it makes it possible to increase the planeness of the finished product, this being a quality required for a great number of uses;

the peripheral ring is produced from a material selected from the group consisting of high-speed steels, tungsten carbide, artificial diamond, ceramics, ceramic/metal phase mixtures better known by the generic term of CERMET, etc.

In an alternative embodiment, the body is coloured in its mass according to a code corresponding to the final intended use of the tool.

How the invention can be put into practice and the advantages arising from it will emerge more clearly from the following exemplary embodiment given as a nonlimiting indication with reference to the accompanying figures.

DETAILED DESCRIPTION OF THE INVENTION

Figure 1:
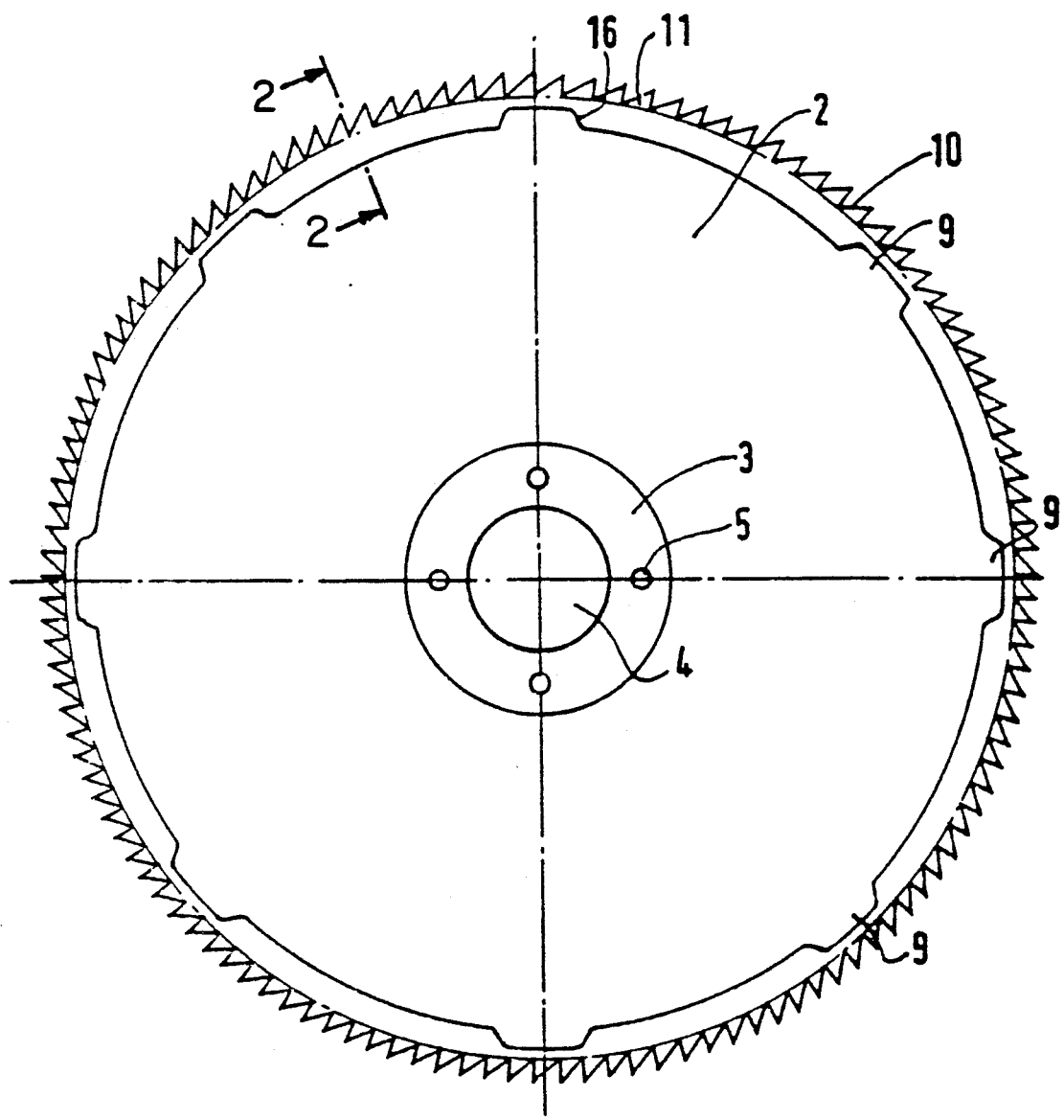
FIG. 1 is a diagrammatic cross-section through a slitting saw according to the invention.

The slitting saw (1) according to the invention consists basically of two parts, namely a central body (2) and a peripheral ring (10).

The central body (2) of circular shape has, at its centre, a hub (3) intended to allow the tool to be fitted onto a drive shaft. This hub is fastened to the said shaft by means of pins (not shown) passing through the orifices (5) formed for this purpose on the hub (3) and produced, for example, by machining. A bore (4) makes it possible to engage the drive shaft.

According to the invention, the entire body (2) with its hub (3) is produced from a synthetic material, for example polyester filled with glass fibres and mineral materials, such as especially talc and mica. This filling of glass fibres thus makes it possible to obtain a very high planeness and, above all, to increase the resilience of the final tool, whilst at the same time preserving the mechanical resistance necessary during the work of the said tool. In a known way, the body (2) has a slight clearance in the region of its outside diameter and then an increase of thickness in the region of the hub (3). As already stated, this clearance is intended essentially to allow the discharge of chips coming from the sawn or cut material and at the same time to allow a lubrication of the peripheral cutting ring (10).

The peripheral ring (10) comprises the actual cutting members, namely teeth (11) in the example described. In a known way, this peripheral ring (10) is produced from high-speed steel known for this use. However, the teeth (11) can possess, in the region of their upper end, a part produced from a very hard material (12), for example tungsten carbide, artificial diamond or even CERMET, in order to reinforce the cutting capacity.

Figure 2:
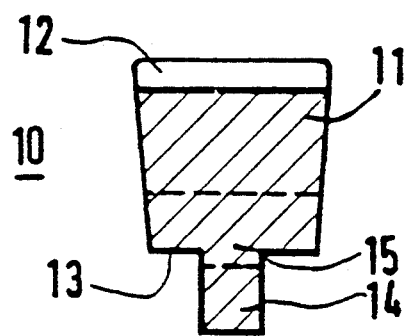
FIG. 2 is a section of the peripheral ring according to the invention taken along the line A-B of FIG. 1.
Figure 3:
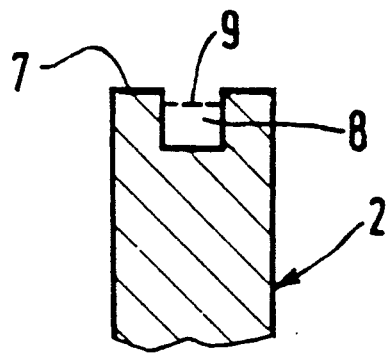
FIG. 3 is a section of the body according to the invention taken along the line A-B of FIG. 1.

The peripheral ring (10) has an inner lateral face (13) intended to come up against the outer lateral face (7) of the body (2) (see FIGS. 2 and 3).

According to the invention, the peripheral ring (10) is fastened to the body (2) by means of an inner circular tenon (14) formed on the inner lateral face (13) of the peripheral ring (10) and directed towards the centre of the slitting saw (1). This tenon (14), the thickness of which is smaller than that of the actual peripheral ring (10), is intended to interact with a complementary groove (8) made in the region of the outer lateral face (7) of the body (2). It is thus impossible for the peripheral ring (10) to come off the rim of the body (2).

The tenon (14) is interrupted periodically in order to become only a slight projection (15) in relation to the inner lateral face (13) of the peripheral ring (10). These interruptions thus define recesses (16) of general trapezoidal shape, the base of which is located towards the centre of the body (2). The various angles defined by these recesses are rounded, in order, as will be described later, to make it possible to assist the shrinkage of the component plastic of the body (2) during its hardening. The tenon (14) and the recesses (16) are produced by the machining of the peripheral ring (10) by any suitable means.

The recesses (16) are intended to interact with the body (2), more precisely with projections (9) obtained directly from the body (2) during the production of the tool and filling these recesses in a complementary manner. The annular groove (8) is consequently filled periodically until the level (9) in FIG. 3 is reached, in contact with the said projection (15). There are thus defined studs in relief (9) formed in the region of the body (2) and intended to interact with the peripheral ring (10), in order to transmit to the latter the driving torque generated by the drive shaft.

The number of corresponding studs (9) depends on the diameter of the cutting tool. Typically, it can vary between five and eight, these values being in no way limiting, but being purely illustrative. For example, a slitting saw of a diameter of 275 mm has eight studs (9), the width of the peripheral ring at these being 8 mm and at the tenon being 12.5 mm. Typically, the thickness of the tenon is in the neighbourhood of one third of the total thickness of the peripheral ring.

The body (2) is put in place on the peripheral ring (10) by injecting the component synthetic material or materials of the body (2) into a mould of suitable shape, in which the peripheral ring (10) has previously been positioned.

Advantageously, the peripheral ring (10) has some clearance, typically of 0° to 5°, as shown in FIG. 2. As already stated, this clearance is intended to allow, on the one hand, the ejection of the chips and, on the other hand, the lubrication of the cutting zone. The thickness of the peripheral ring (10) in the region of its inner lateral wall (13) consequently corresponds to that of the body (2) in the region of its outer lateral face.

Figure 4:
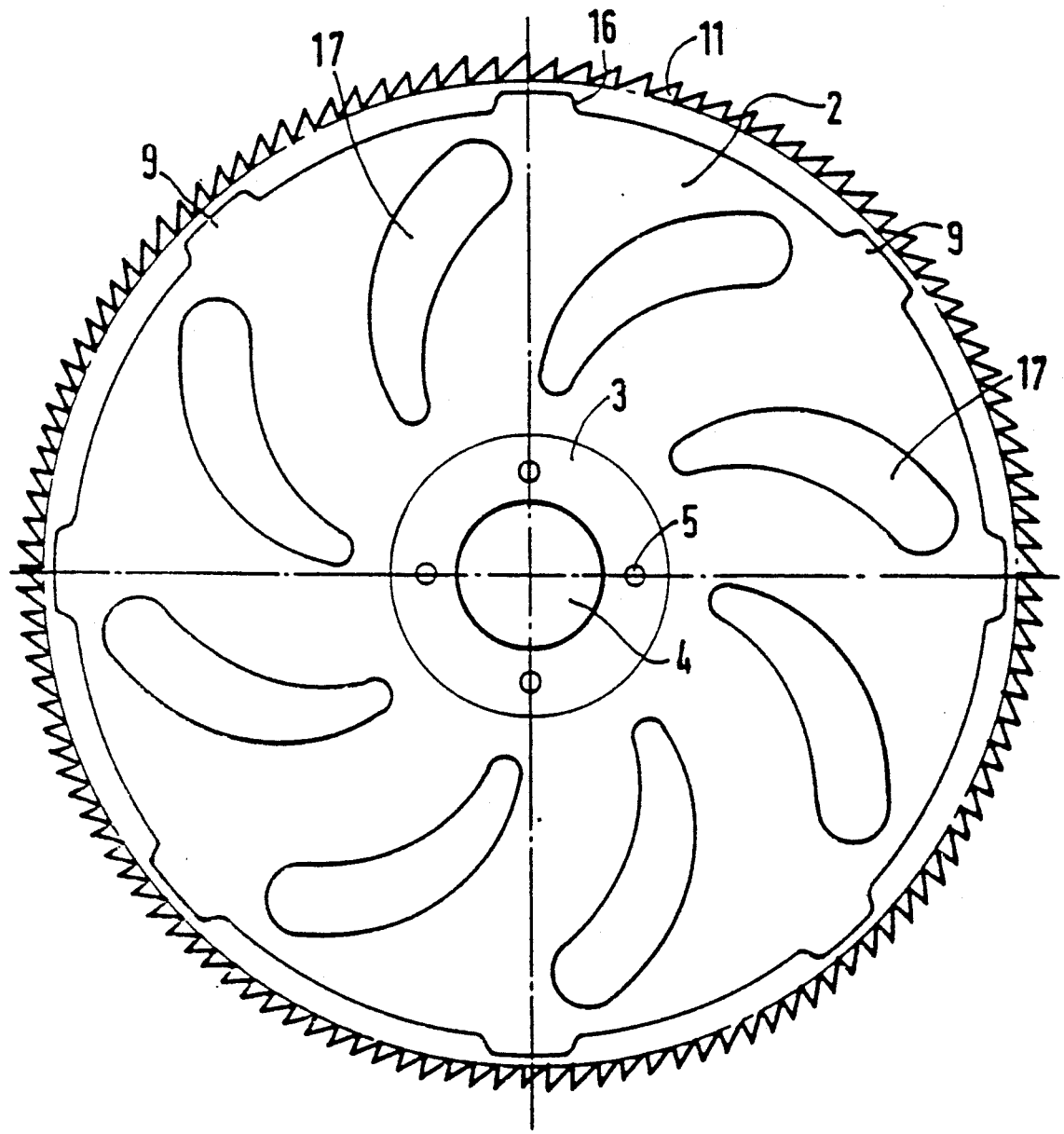
FIG. 4 is a cross-section, similar to that of FIG. 1, of another embodiment of the invention.

In an especially advantageous form of the invention illustrated in FIG. 4, the body (2) has arcuate oblong indentations (17) extending from the hub (3) to the vicinity of the periphery. These indentations (17) obtained as a result of the moulding first have a substantially radial direction in the vicinity of the hub (3) and then widen in the direction of the periphery, until they assume a direction substantially parallel to the circumference of the body (2). Thus, during the injection of the plastic, the glass fibres and mineral fibers which it contains experience a preferred orientation parallel to the circumference of the body in the vicinity of its periphery, especially in the region of the studs (9), thereby assisting the transmission of the driving torque to the peripheral ring (10).

Thus, the rotary cutting tool so obtained can be used for cutting all materials, especially steels and nonferrous materials, as well as wood, plastics and food products. For that, it is sufficient to adapt the bore, the quality of the component material of the peripheral ring (10) and the shape of the teeth. Moreover, these cutting tools have a very high capacity for absorbing vibrations, significantly reducing the noise caused during cutting and thus making the work carried out on the saws less arduous.

Furthermore, the resilience of these tools is greatly improved in relation to the cutting tools known hitherto. Moreover, in the event of breakage of the cutting tools which is especially dangerous in view of the rotational speed, there are no splinters, in contrast to conventional tools. They can therefore be used in complete safety.

Finally, since the body is produced from a cheap material, the cost price of these tools is markedly reduced. The resharpening operation is thus no longer systematically necessary. The problems of stock and of the management of this stock which have hitherto arisen can thus be avoided.

It may also be mentioned that, because of this original method of fastening the peripheral ring to the body, there is no longer any fear of obtaining warped and therefore useless tools, and that, furthermore, a virtually complete transmission of the driving torque in the region of the cutting zone can be expected.

We claim:

1. A circular rotary cutting tool comprising:
   a body of substantially planar and circular shape which is produced from a synthetic material, whose center comprises a hub, and having an outer lateral face, a peripheral area, and an outer edge;
   a substantially planar, circular peripheral ring with an outer cutting edge, having an inner lateral face, and being produced from a cutting material;
   said ring being fastened to said body by an irreversible fastening means further comprising:
   a inner tenon parallel to an coplanar with said ring, said tenon being on the inner lateral face of said ring and forming an integral part of said ring, said tenon corresponding spatially to a complementary groove on the outer lateral face of said body; and
   a plurality of radial projections extending from and coplanar with said body, spatially corresponding to recesses defined by periodic interruptions of the tenon in said ring.

2. A cutting tool according to claim 1 wherein the thickness of said tenon is smaller than the thickness of said peripheral ring.

3. A cutting tool according to claim 1 wherein the body possesses arcuate hollow indentations directed radially from the hub and bending at the periphery of said body so as to become virutally parallel to the outer edge of said body.

4. A cutting tool according to claim 1 wherein the synthetic material of the body contains mineral balls selected from one of the group consisting of glass, talc, and mica.

5. A cutting tool according to claim 1 wherein the peripheral ring is produced from material selected from the group consisting of high-speed steels, tungsten carbide, artificial diamond, ceramics and ceramic/metal phase mixtures.

6. A cutting tool according to claim 1 wherein the synthetic material of the body contains coloring which represents a code corresponding to an intended use of the tool.

7. A cutting tool according to claim 1 wherein said recesses in said body are substantially trapezoidal, widening in the direction of the center of said body.

8. A cutting tool according to claim 7 wherein the corners of each of said trapezoidal recesses are rounded.

9. A cutting tool according to claim 1 wherein the synthetic material of the body is selected to be one or more of the group consisting of polyesters, polyamides, polyarylamides and phenylene polysulphide.

10. A cutting tool according to claim 9 wherein the synthetic material of the body is reinforced by one of the group consisting of glass fibers and mineral fibers.

* * * * *